United States Patent [19]

Hada et al.

[11] Patent Number: 5,663,814
[45] Date of Patent: Sep. 2, 1997

[54] DIGITAL IMAGE FORMING APPARATUS FOR FORMING A STABLE IMAGE

[75] Inventors: Yoshinobu Hada, Aichi-ken; Kazuyuki Fukui, Toyohashi; Takanobu Yamada, Toyokawa, all of Japan

[73] Assignee: Minolta Co., Ltd., Osaka, Japan

[21] Appl. No.: 365,798

[22] Filed: Dec. 29, 1994

[30] Foreign Application Priority Data

Dec. 29, 1993 [JP] Japan .................. 5-351058

[51] Int. Cl.$^6$ .................................................. H04N 1/21
[52] U.S. Cl. ...................................... 358/475; 358/298
[58] Field of Search ............................ 358/296, 298, 358/475, 457; 355/259, 265; 399/51, 47, 32

[56] References Cited

U.S. PATENT DOCUMENTS

| | | | |
|---|---|---|---|
| 4,679,057 | 7/1987 | Hamada | 346/76 L |
| 4,799,069 | 1/1989 | Sasaki et al. | 346/108 |
| 4,885,672 | 12/1989 | Watanabe | 363/21 |
| 5,124,802 | 6/1992 | Ito et al. | 358/298 |
| 5,189,441 | 2/1993 | Fukui et al. | 346/160 |
| 5,257,075 | 10/1993 | Ohki et al. | 399/51 |
| 5,381,221 | 1/1995 | Mizoguchi et al. | 399/51 |

*Primary Examiner*—Edward L. Coles, Sr.
*Assistant Examiner*—Stephen Brinich
*Attorney, Agent, or Firm*—Sidley & Austin

[57] ABSTRACT

In an electrophotographic process, a laser beam exposes a photoconductor according to image density level to form a latent image. In the exposure, a duty ratio of light emission period to a length of a dot is changed according to the density level. In a first mode, the duty ratio is decreased with the density level if the density level is lower than a predetermined density level, while in a second mode, the duty ratio is increased if the density level is higher than a predetermined density level. Thus, the nonlinearity of gradation characteristic is improved. A user can select a desired mode among three modes on the duty ratio to reproduce an image of desired image quality. Thus, the nonlinearity of gradation characteristic is improved, and an image can be reproduced stably.

11 Claims, 11 Drawing Sheets

DIGITAL IMAGE FORMING APPARATUS FOR FORMING A STABLE IMAGE

BACKGROUND OF THE INVENTION

1. Field of the Invention

The present invention relates to a digital image forming apparatus such as a digital printer or a digital copying machine which expresses gradation by modulating light intensity.

2. Description of the Prior Art

In a digital image forming apparatus such as a digital printer or a digital copying machine which expresses gradation by modulating light intensity, a photoconductor is exposed in raster scan with a laser beam at an intensity modulated according to density level of image data of a document detected by an image reader. In the raster scan, a laser beam exposes the photoconductor during a time in correspondence to a length of one dot. Thus, an electrostatic latent image is formed on the photoconductor by forming each dot with a laser beam at an optical intensity in correspondence to density level data.

Unfortunately, the density level of the image data of a document is not proportional to an output density level of an image reproduced on a paper due to various conditions such as photoelectric characteristic of the photoconductor, toner characteristic and environment factors such as humidity and temperature. That is, the density level of image data of a document changes nonlinearly with the output density level of a reproduced image. This is called as gamma characteristic (or gradation characteristic) which is a large factor which deteriorates fidelity of a reproduced image especially for a half-tone image.

Then, the density level of image data of a document are corrected beforehand in order to correct the gradation characteristic, and exposure is performed according to the corrected gradation characteristic. Thus, for example, a linear relation between the document density and the output density can be realized. This is called as gradation correction (or gamma correction). In many cases, a linear characteristic is desired.

As mentioned above, the nonlinearity depends on many factors such as photoelectric characteristic, toner characteristic and environment factors. The nonlinearity changes for example with the sensitivity of the photoconductor or with a charge amount of a development material. If the nonlinearity of gradation characteristic is large, an image data has to be corrected by a large amount, and the correction may enhance a characteristic change, and the precision of the correction decreases. Then, the stability of gradation is liable to be deteriorated. Therefore, it is desirable that the nonlinearity of the gradation characteristic is small.

SUMMARY OF THE INVENTION

An object of the present invention is to provide an digital image forming apparatus which forms an image stably.

In one aspect of a digital image forming apparatus, a surface of a photoconductor is exposed with a beam in raster scan so as to form an electrostatic latent image thereon. The exposure is inhibited periodically every predetermined period and an interval is formed between light-emitting periods. A ratio is defined as a ratio of a light-emitting period to a sum of the light-emitting period and a non-light-emitting period. In a mode, the ratio is changed according to the image density if the image density of the image data is lower than a predetermined level. In a different mode, the ratio is changed according to the image density if the image density of the image data is larger than a predetermined level. The two modes may be combined. Preferably, the laser output power is increased according to the mode in order to compensate a decrease in exposure quantity of light.

An advantage of the present invention is to provide a digital image forming apparatus which reproduces an image stably by suppressing the nonlinearity of the gradation characteristic.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
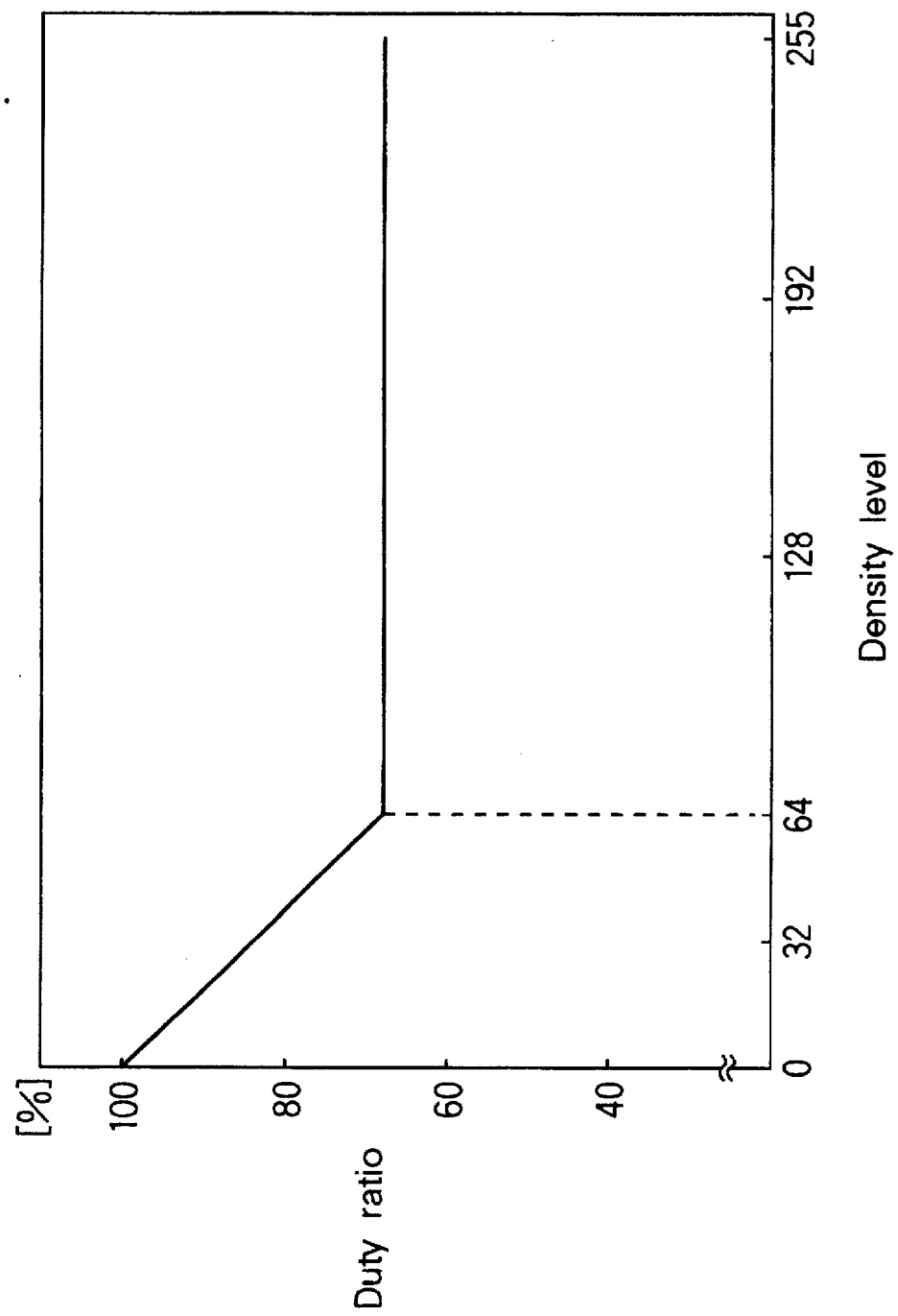
FIG. 1 is a graph of a duty ratio plotted against density level in a first mode.

Referring now to the drawings, wherein like reference characters designate like or corresponding parts throughout the several views, a digital copying machine of an embodiment of the invention is explained below. The digital copying machine forms an electrostatic latent image on a photoconductor by modulating light intensity of a laser beam in raster scan. In the raster scan, the photoconductor is exposed for each dot during a predetermined time period during a time period in correspondence to a full size of one dot. Thus, each dot is formed in correspondence to an intensity of density level data. Further, in the digital copying machine, an appropriate duty ratio is set according to density level of a document image in order to improve image quality by decreasing the nonlinearity of the gradation characteristic for a reproduced image. A duty ratio represents a ratio of a light-emitting period to a time length assigned to one pixel (or a sum of light-emitting period and a non-light emitting period. Thus, toner density at an interval between two light emitting portions on the photoconductor becomes smaller, and this improves image quality.

The digital copying machine has three modes on duty ratio which can be selected by a user and three duty ratio tables on gradation correction characteristic are provided for the three modes. Then, copy operation is performed after the duty ratio table and a standard laser output power appropriate for the duty ratio table are set beside a gradation correction table. A duty ratio table defines duty ratio against density level. The optical intensity of laser beam is modulated according to the density level, and the standard laser output power defines the laser output power for the duty ratio of 100%.

Figure 2:
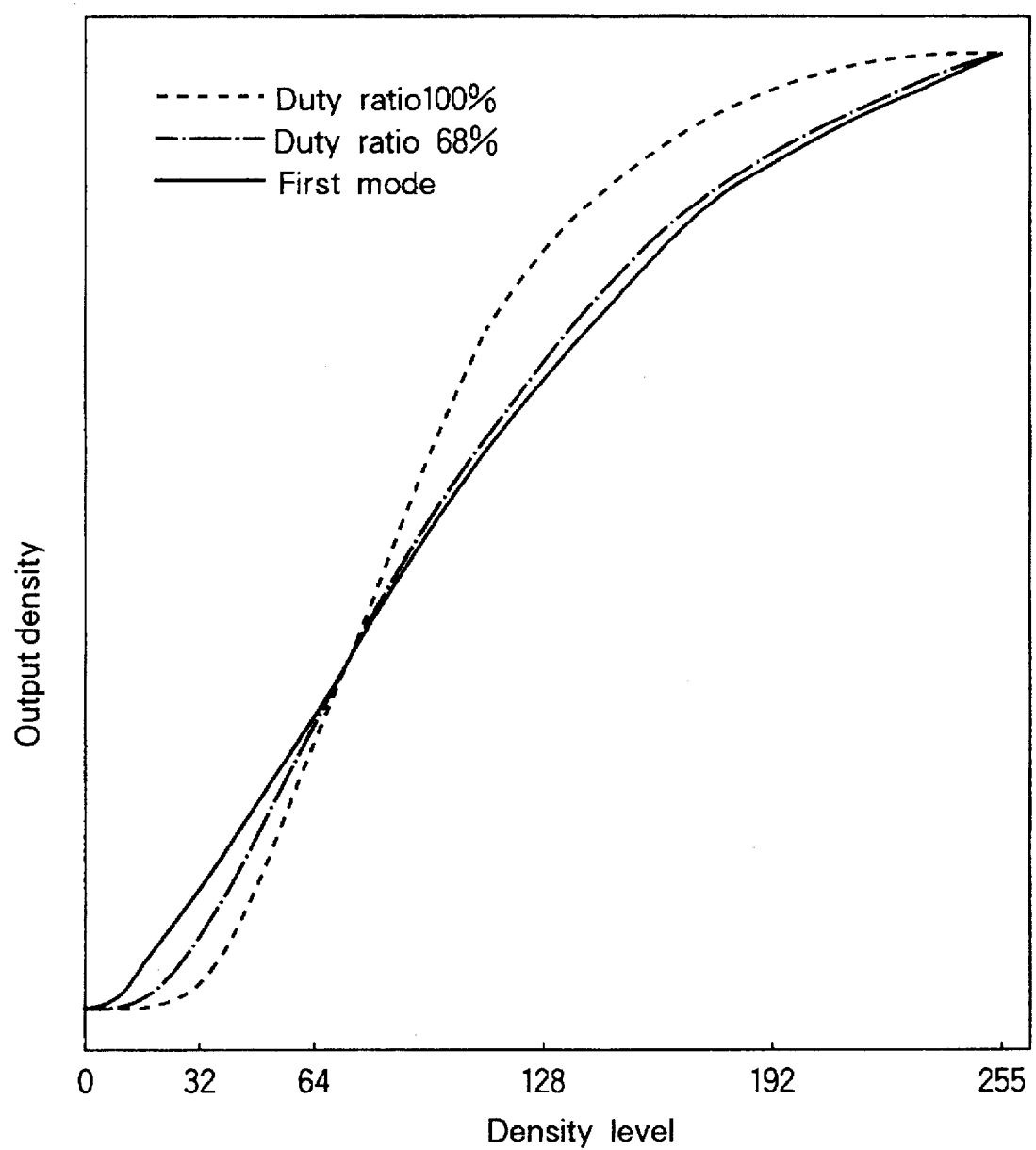
FIG. 2 is a graph of gradation curves in the first mode.

In the first mode, the duty ratio is set as shown in FIG. 1. In the digital copying machine, the density level changes between 0 and 255. The duty ratio is set at 100% for density level of 0. Then, it decreases linearly to a predetermined value, say 70%, as the density level increases to a predetermined level, say 64. Then, it has a constant value up to the maximum density level 255. A solid curve in FIG. 2 shows a gradation characteristic in the first mode. For comparison, a dashed curve and a dash and dot curve in FIG. 2 are shown for constant duty ratios of 100% and 68%. It is clear that nonlinearity of the gradation characteristic is improved largely in the first mode, especially near zero level by changing duty ratio between density levels 0–64.

Figure 3:
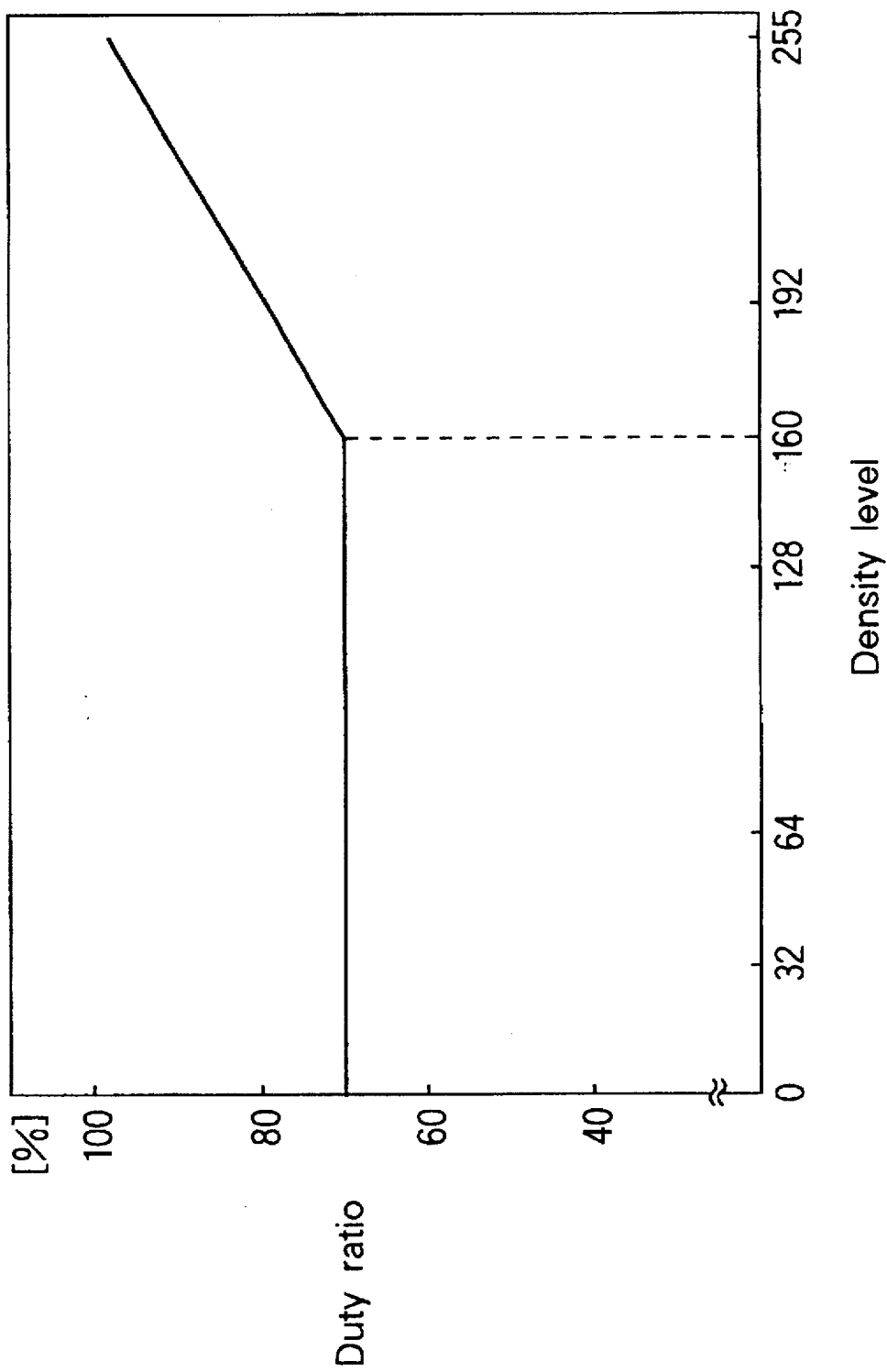
FIG. 3 is a graph of a duty ratio plotted against density level in a second mode.
Figure 4:
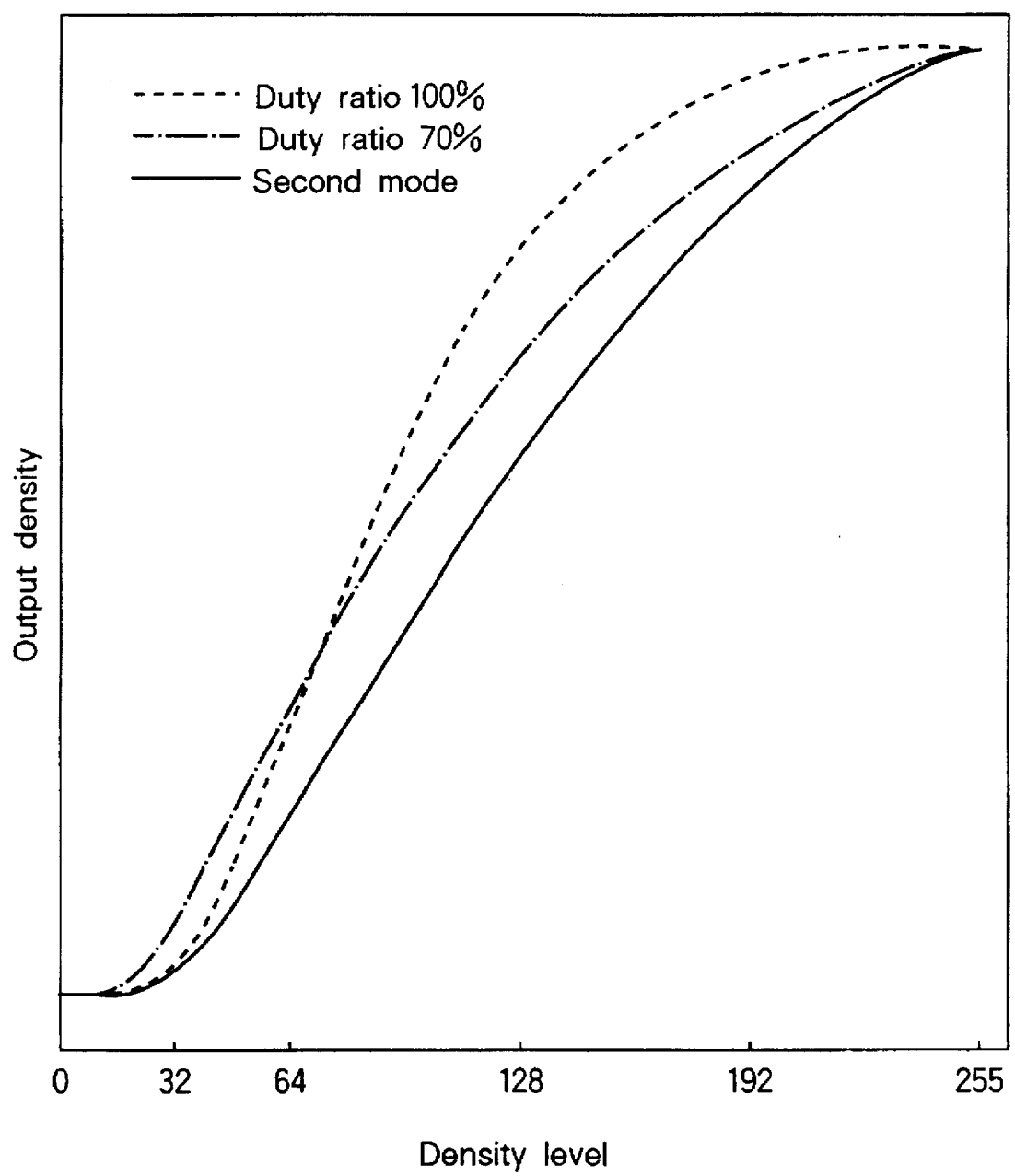
FIG. 4 is a graph of gradation curves in the second mode.

In the second mode, the duty ratio is set as shown in FIG. 3. The duty ratio is set constant at 70% for density levels from 0 to a predetermined level, say 160. Then, it increases linearly to 100%, as the density level increases to a maximum level 255. A solid curve in FIG. 4 shows a gradation characteristic in the second mode. For comparison, a dashed curve and a dash and dot curve in FIG. 4 are shown for constant duty ratios of 100% and 70%. It is clear that nonlinearity of the gradation characteristic is improved largely in the second mode, especially at intermediate levels by changing duty ratio between levels 160–255.

Figure 5:
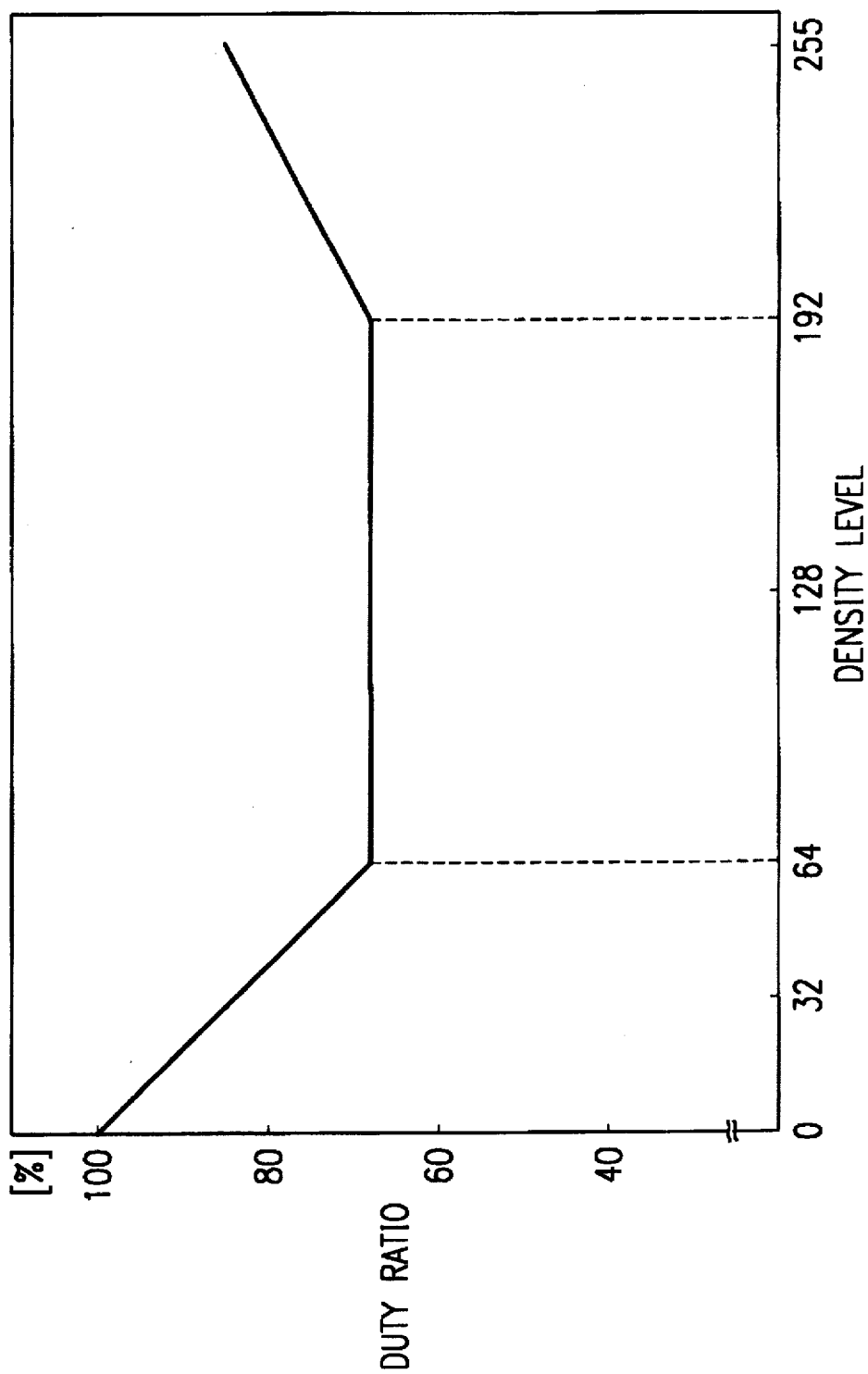
FIG. 5 is a graph of a duty ratio plotted against density level in a third mode.
Figure 6:
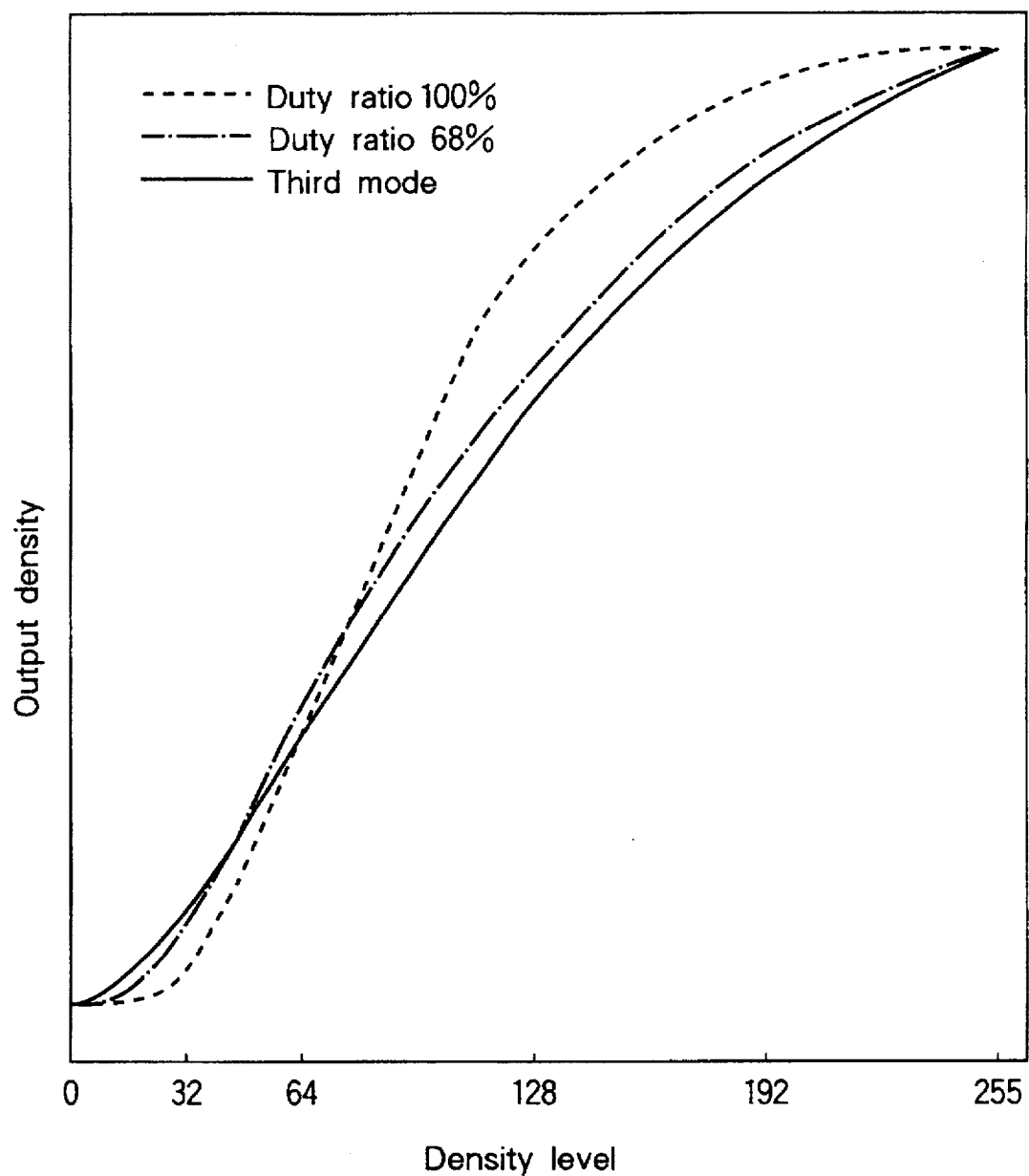
FIG. 6 is a graph of gradation curves in the third mode.

In the third mode, the duty ratio is set as shown in FIG. 5. The duty ratio is set at 100% for density level of 0. Then, it decreases linearly to a predetermined value, say 70%, as the density level increases to a first predetermined level, say 64. Then, the duty ratio is set constant at 70% for density levels from 64 to a second predetermined level, say 192. Then, it increases linearly to 100%, as the density level increases to a maximum level 255. A solid curve in FIG. 6 shows a gradation characteristic in the third mode. For comparison, a dashed curve and a dash and dot curve in FIG. 6 are shown for constant duty ratios of 100% and 68%, similarly to FIG. 2. It is clear that nonlinearity of the gradation characteristic is improved largely in the third mode, both near zero level and at intermediate levels by changing duty ratio between 0–64 and between levels 192–255.

Each of the three modes is explained further in detail. In the first mode, the duty ratio is changed at low density levels, as shown in FIG. 1, and the nonlinearity at low density levels is improved. The duty ratio changes in the first mode as follows:

$$D = A - B*L \quad \text{if } 0 \leq L < L_1,$$

and $$D = A - B*L_1 \quad \text{if } L_1 \leq L < L_2,$$

wherein A, B, $L_1$ and $L_2$ are variables. The variable A determines the duty ratio at density level of 0, while B denotes a gradient of duty ratio when the density level exists between 0 and $L_1$. The variable $L_1$ determines a range where the duty ratio is changed, while $L_2$ determines a maximum value of the density level.

In the example shown in FIG. 1, A=100, B=0.5, $L_1$=0 and $L_2$=255. Then, $$D = 100 - 0.5*L \, (\%) \quad \text{if } 0 \leq L < 64$$

and $$D = 100 - 0.5*L_1$$
$$= 68\% \quad \text{if } 64 \leq L \leq 255.$$

That is, the duty ratio changes by 0.5% as the density level L increases by one in a range between 0 and 63. The duty ratio is constant at 68% for density levels L of 64 or more.

When the duty ratio is decreased to a value less than 100%, a radiation power onto the photoconductor per pixel is deficient if compared with a case of duty ratio of 100%. In order to make up for the deficiency, a standard laser output power $P_2$ is higher than that for the duty ratio of 100 %. The data of the standard laser output power $P_2$ is stored in a duty data ROM 98 (FIG. 10) as well as a duty ratio table for the first mode. In the above-mentioned example, $P_2 = 1.48*P_1$. Among the gradation curves for three cases shown in FIG. 2, the standard laser output power $P_1$ is used for the gradation curve for the duty ratio of 100%, as explained above, while the larger standard laser output power $P_2$ is used for the gradation curve for the duty ratio of 68% and for the gradation curve for the first mode.

If the gradation curve for the duty ratio of 68% is compared with that of 100%, it is observed for the former curve to become more linear at low density levels because the standard laser output power is increased, as explained above. Further, at high density levels, the output density saturates more slowly because toners adhere less between exposed portions because the duty ratio is less than 100%. Therefore, the nonlinearity of gradation curve is improved for duty ratio of 68%. The nonlinearity of the gradation curve is improved further in the first mode. At high density levels above 64, the gradation curve in the first mode agrees generally to that of the duty ratio of 68%. On the other hand, the nonlinearity of the gradation curve in the first mode is improved further at low density levels below 64 than the gradation curve of the duty ratio of 68% because the duty ratio is changed while keeping the standard output power $P_2$ constant.

In the second mode, the duty ratio is changed at high density levels, as shown in FIG. 3, and the nonlinearity at intermediate density levels is improved. The duty ratio changes as follows:

$$D = C \quad \text{if } 0 \leq L \leq L_3,$$

and $$D = C + E*L - L_3 \quad \text{if } L_3 < L \leq L_4,$$

wherein C, E, $L_3$ and $L_3$ are variables. The variable C determines the duty ratio at density levels between 0 and $L_3$, while E denotes a gradient of duty ratio when the density level exists between $L_3$ and $L_4$. The variable $L_3$ determines a range where the duty ratio is changed, while $L_4$ determines a maximum value of the density level.

In the example shown in FIG. 3, C=70, E=0.3, $L_3$=160 and $L_4$=255. Then, $$D = 70\% \quad \text{if } 0 \leq L \leq 160,$$

and $$D = 70\% + 0.3*(L - 160) \quad \text{if } 160 < L \leq 255,$$

That is, the duty ratio is constant at 70% for density levels L of 160 or less. The duty ratio changes by 0.3% as the density level L increases by one in a range between 160 and 255, and it is 98.5% at density level of 255.

When the duty ratio is decreased to less than 100%, a radiation power onto the photoconductor per pixel has to be increased as in the first mode. A standard laser output power $P_3$ for the duty ratio of 70% and a standard laser output power $P_4$ for the second mode are increased than the counter-part $P_1$ for duty ratio of 100%. In the example, $P_3 = 1.42*P_1$. In the second mode, the duty ratio is 98.5% for the maximum density level 255. Then, $P_4 = 1.02*P_1$ so that the laser power at the maximum level is equal to each other for the duty ratio of 100% and for the second mode. The data of the standard laser output power $P_4$ is also stored in the duty data ROM 98 (FIG. 10) as well as a duty ratio table for the second mode. Among the gradation curves for three cases shown in FIG. 4, the standard laser output power $P_1$ is used for the gradation curve for the duty ratio of 100%, as explained above, while the larger standard laser output power $P_3$ is used for the gradation curve for the duty ratio of 70% and the larger standard laser output power $P_4$ is used for the gradation curve for the second mode.

If the gradation curve for duty ratio of 70% is compared with that of 100%, the former curve becomes more linear at low density levels because the standard laser output power is increased, as explained above. Further, at high density levels, the output density saturates more slowly because toners adhere less between exposed portions because the duty ratio is less than 100%. Therefore, the nonlinearity of gradation curve is improved for duty ratio of 70%. The nonlinearity is also improved at intermediate density levels in the second mode. At low density levels near zero, the nonlinearity of the gradation curve in the second mode is enhanced because the standard laser output power $P_4$ is about the same as $P_1$ though the duty ratio is 70% much smaller that 100%. However, because the duty ratio is changed at high density levels above 160 while keeping the standard output power $P_4$ constant, the nonlinearity of the gradation curve in the second mode is improved largely at intermediate density levels. Therefore, the second mode is suitable for a half-tone image.

In the third mode, the duty ratio is changed at low and high density levels, as shown in FIG. 5, and the nonlinearity is improved at low density levels and at intermediate density levels. That is, the duty ratio table in the third mode has characteristics of both first and second modes. The duty ratio changes in the third mode as follows:

$$D = F - G*L, \quad \text{if } 0 \leq L < L_5,$$
$$D = F - G*L_5 + H*L_5 \quad \text{if } L_5 \leq L \leq L_6$$

and $$D = F - G*L_5 + H*(L - L_6) \quad \text{if } L_6 < L \leq L_7,$$

wherein F, G, H, $L_5$, $L_6$ and $L_7$ are variables. The variable F determines the duty ratio at density level of 0, the variable G determines a gradient of duty ratio when the density level exists between 0 and $L_5$, and the variable H determines a gradient of duty ratio when the density level exists between $L_6$ and $L_7$. The variable $L_5$ determines a range where the duty ratio is changed with the gradient G, $L_6$ determines a density level range having the duty ratio at density level $L_5$, while $L_7$ determines a maximum value of the density level.

In the example shown in FIG. 5, F=100, G=0.5, H=0.25, $L_5$=64, $L_6$=192 and $L_7$=255. Then, $$D = 100 - 0.5*L \, (\%) \quad \text{if } 0 \leq L < 64$$
$$D = 100 - 0.5*64$$
$$= 68 \, (\%) \quad \text{if } 64 \leq L \leq 192$$

and $$D = 100 - 0.5*64 + 0.25*(L - 192)$$
$$= 68 + 0.25*(L - 192) \, (\%) \quad \text{if } 192 < L \leq 255.$$

That is, the duty ratio decreases by 0.5% in the range below density levels L of 64 as the density level L increases by one, while the duty ratio changes by 0.25% as the density level L increases by one in the range above 255, and it attains to 98.5% at density level of 255.

When the duty ratio is decreased to less than 100%, a radiation power onto the photoconductor per pixel is deficient if compared with a case of duty ratio of 100%. In order to make up for the deficiency, a standard laser output power $P_2$ for the constant duty ratio of 68% and a standard laser output power $P_5$ for the third mode are increased than that for the constant duty ratio of 100%. In the example of the third mode, the duty ratio is 83.75% for the maximum density level 255. Then, $P_5$ is increased by 15-25% than $P_1$, say $P_5$=1.19*$P_1$ so that the laser power at the maximum level is equal to those for the duty ratio of 100% and for the third mode. The data of the standard laser output power $P_5$ is also stored in the duty data ROM 98 (FIG. 9) as well as a duty ratio table for the third mode. Among the gradation curves for three cases shown in FIG. 6, the standard laser output power $P_1$ is used for the gradation curve for the duty ratio of 100%, as explained above, while the larger standard laser output power $P_2$ is used for the gradation curve for the duty ratio of 68% and the larger standard laser output power $P_5$ is used for the gradation curve for the third mode.

If the gradation curve for duty ratio of 68% is compared with that of 100%, the nonlinearity of the gradation curve is improved, as explained above on FIG. 2. However, because the duty ratio is changed at low density levels below 64 and at high density levels above 160 while keeping the standard output power $P_5$ constant, the nonlinearity of the gradation curve in the third mode is improved largely at low density levels and at intermediate density levels, though the nonlinearity is not improved better than that of the first mode because the standard laser output power $P_5$ is smaller than $P_2$.

It is to be noted that the change in duty ratio in a density level range may not be linear in the above-mentioned three modes.

Figure 7A:
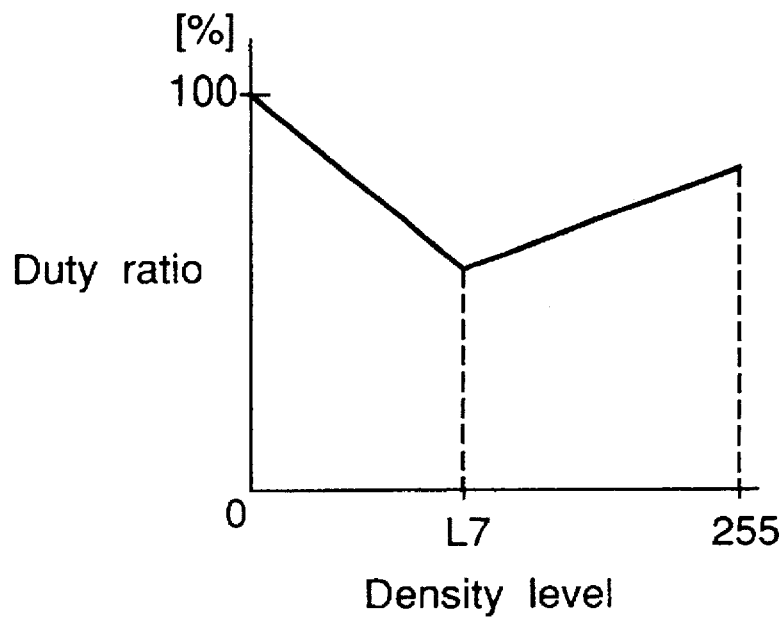
FIG. 7A and 7B show graphs of duty ratio plotted against density level in modified examples of the third mode.
Figure 7B:
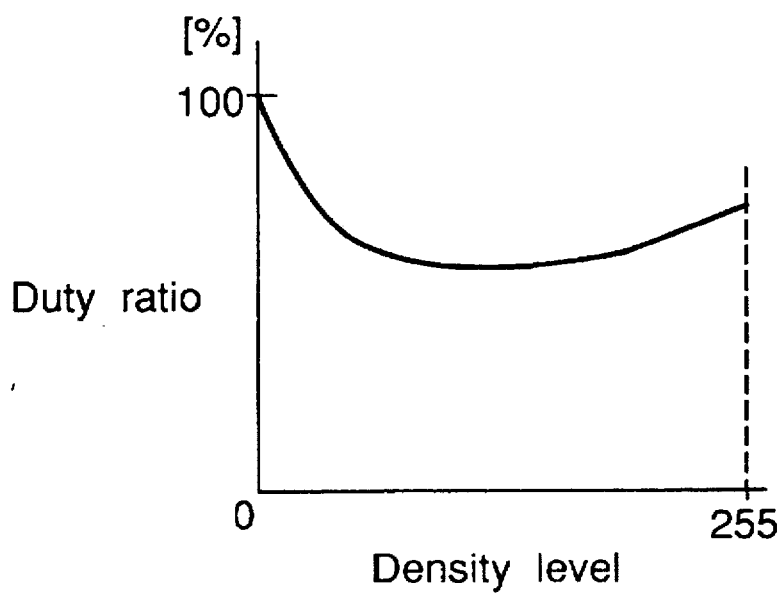

FIGS. 7A and 7B show modified examples of the third mode. In the example shown in FIG. 7A, no intermediate region of constant duty ratio is provided. That is, the duty ratio decreases linearly at low density levels below $L_7$, while it increases linearly at high density levels above $L_7$. In the example shown in FIG. 7B, the duty ratio decreases at first and increases next as shown in FIG. 5, but it changes smoothly nonlinearly in this example.

Figure 8:
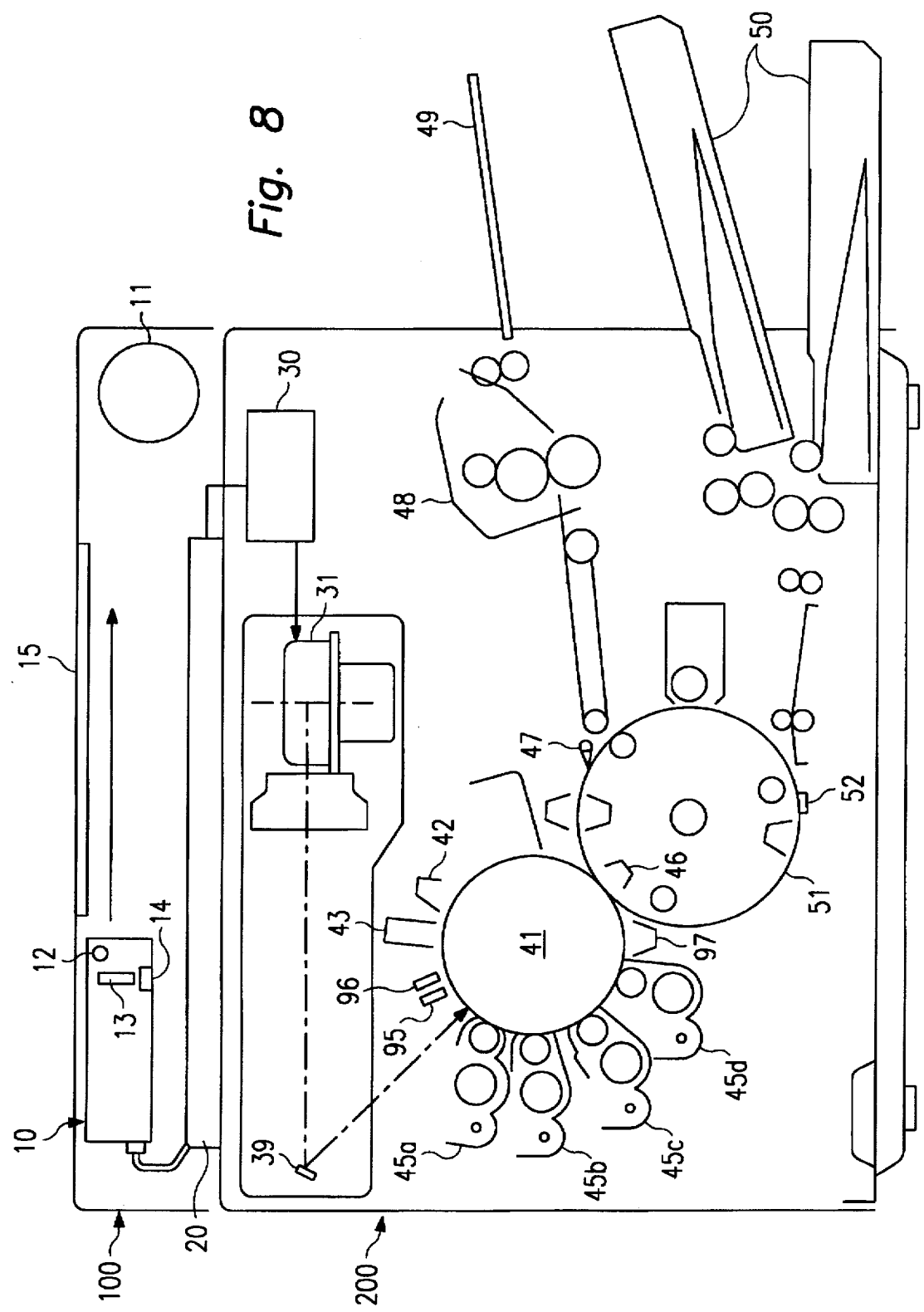
FIG. 8 is a schematic sectional view of a digital color copying machine.

FIG. 8 shows a digital color copying machine schematically, and it consists of an image reader 100 and a printer 200 for reproducing an image read by the image reader 100.

In the image reader 100, a scanner 10 has an exposure lamp 12 for illuminating a document placed on a platen 15, a rod lend array 13 for collecting a light reflected from the document and a CCD color image sensor 14 for converting the collected light to an electric signal. When the document is read, the scanner 10 is driven by a motor 11 to move along a direction shown with an arrow to scan a document placed on the platen. 15. An image on a document illuminated by the exposure lamp 12 is converted by the image sensor 14 to electric signals of red, green and blue. A read signal processor 20 converts the electric signals to 8-bit gradation data of yellow, magenta, cyan and black which are sent to a controller 30.

In the printer 200, the controller 30 receives 8-bit gradation data from the read signal processor 20, corrects the gradation characteristic based on various data from sensors and supplies drive signals for modulating a laser beam to a print head 31 by using a duty ratio table selected by a user. A rotating photoconductor drum 41 is illuminated by an eraser lamp 42 and charged uniformly by a sensitizing charger 43 before each copy operation. A laser beam emitted by the print head 31 is reflected by a mirror 39 to expose a photoconductor drum 41 to form an electrostatic latent image. One of developing units 45a, 45b, 45c and 45d for cyan, magenta, yellow and black is selected to develop the latent image to form a toner image. The toner image is transferred by a transfer charger 46 on a paper on a transfer drum 51. This scan and print process is repeated four times for the four colors. Then, the paper is separated by operating a claw 46 and fixed by a fixing unit 48 to be discharged onto a tray 49.

Figure 9:
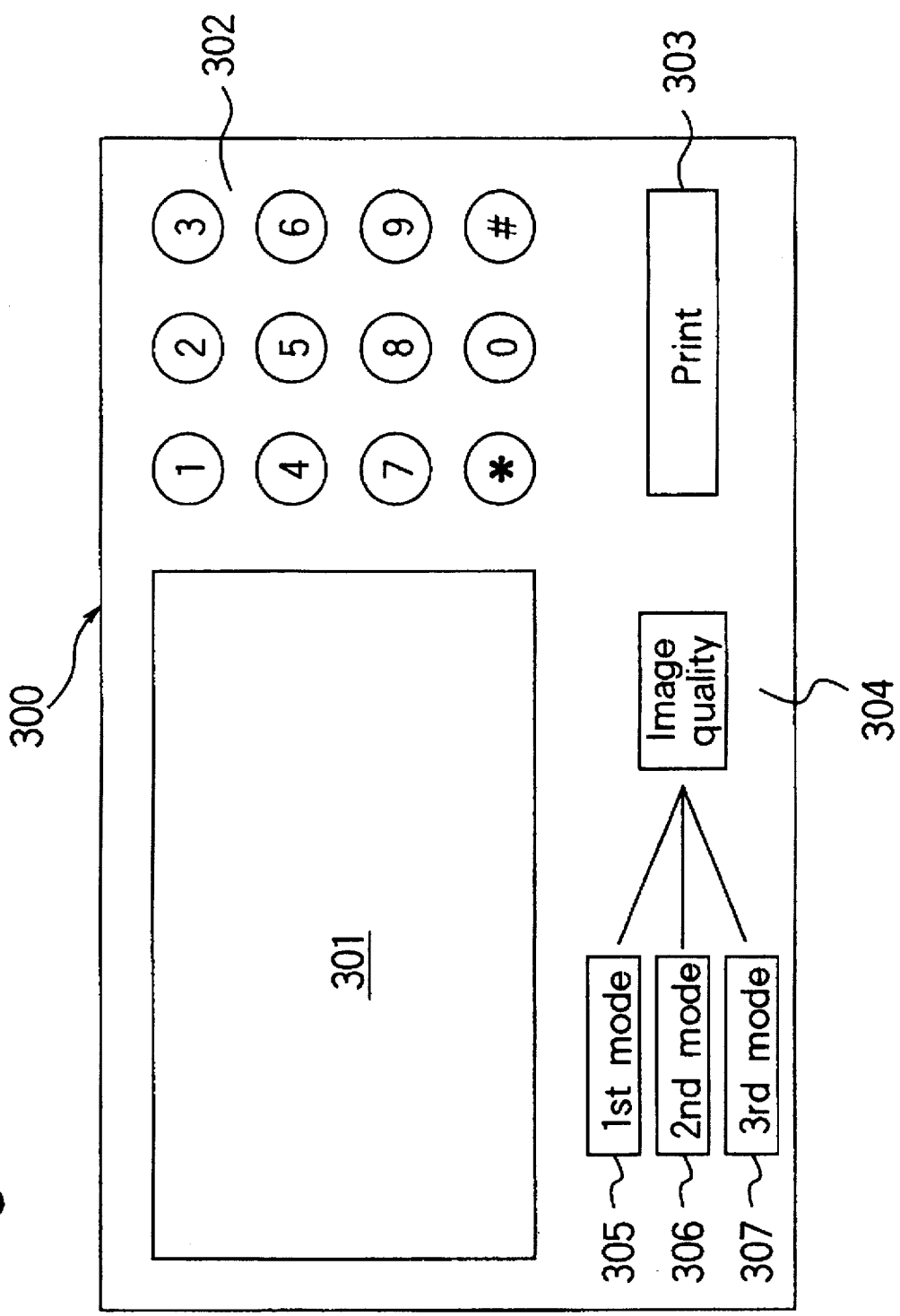
FIG. 9 is a plan view of an operational panel.

FIG. 9 shows an operational panel 300 including a liquid crystal display 301 for displaying various copy information, ten-keys 302 for inputting a number of papers to be printed or the like, a print key 303 for starting copy operation, an image quality key 304 for selecting image quality and LEDs 305, 306 and 307. When a user presses the image quality key 304, one of the LEDs 305, 306 and 307 are turned on cyclically to display that an image quality mode among the first mode, the second mode and the third mode is selected.

Figure 10:
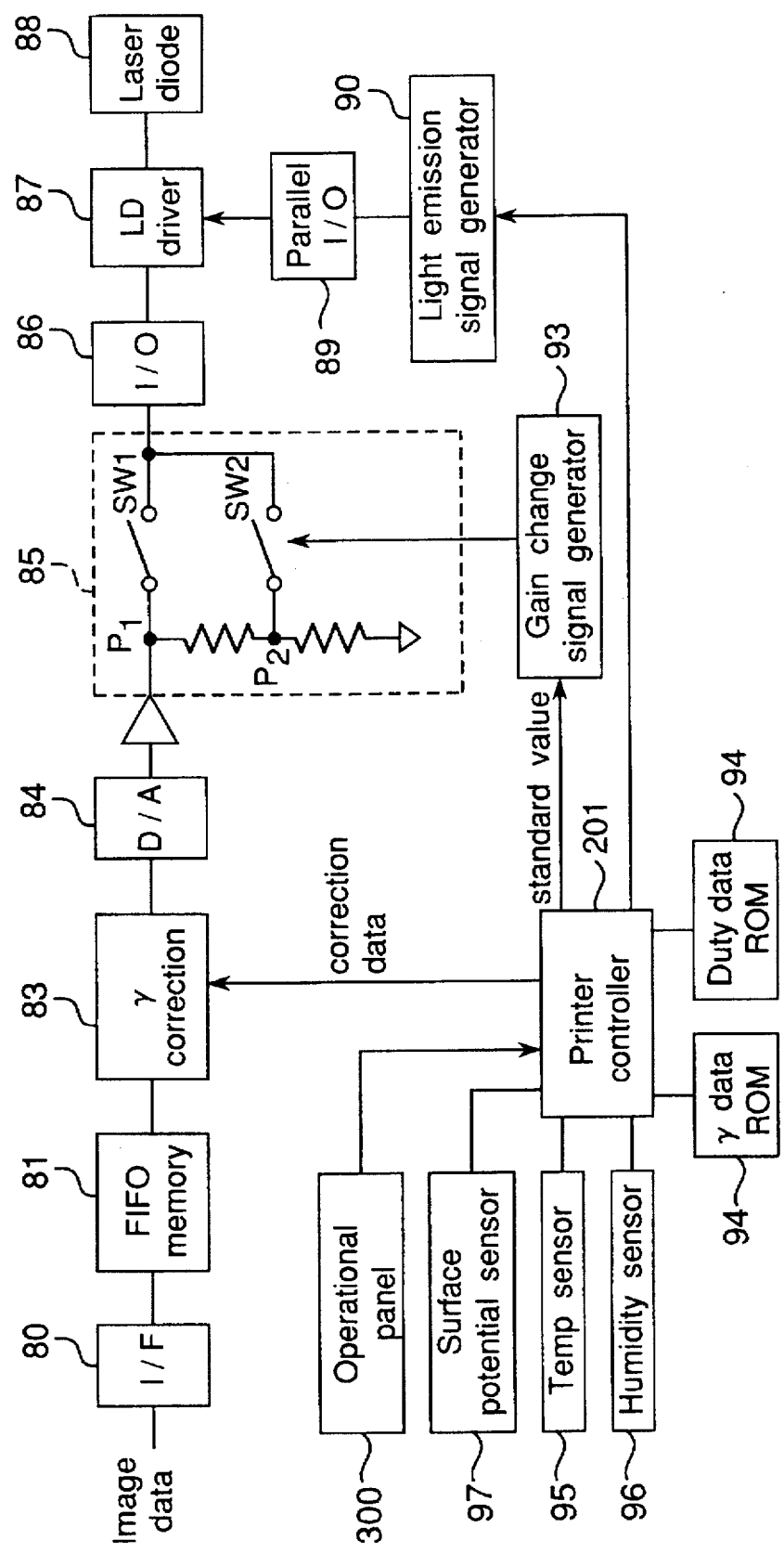
FIG. 10 is a block diagram of a print head.

FIG. 10 shows a block diagram of the controller 31. The 8-bit image data received from the image signal processor 20 by the interface 80 to be stored in a first-in first-out (FIFO) memory 81. The FIFO memory 81 is a buffer memory which can store gradation data of lines of a prescribed number. A printer controller 201 reads an appropriate gamma correction table from the gamma data ROM 94 according to measured values of a temperature sensor 95, a humidity sensor 96, a surface potential sensor 97 and other sensors such as AIDC sensor not shown explicitly. Then, it sends the gamma correction table to a gamma correction section 83 and a standard laser output power in correspondence to the selected gamma correction table and an image quality mode to the change signal generator 93. Further, it sends a duty ratio table according to the image quality mode to a light emission signal generator 90. The gamma correction section 83 corrects the gradation data read from the FIFO memory 81 by using the gamma correction table, and the corrected gradation data L is sent to a D/A converter 84 and to a light emission signal generator 90. The D/A converter 84 converts the corrected gradation data L to an analog voltage, which is amplified by an amplifier 85 according to a gain or output power set by the change signal generator 93 by using switches SW1, SW2 and the like. The amplified analog voltage is sent through a drive I/O circuit 86 to a driver 87 for a laser diode 88 which emits a light at an intensity modulated according to image data. On the other hand, the light emission signal generator 90 determines a duty ratio for the density level L by using the duty ratio table received from the printer controller 201. That is, the light emission signal generator 90 sends a light emission signal only in a light emission period through a parallel I/O circuit 89 to the laser diode driver 87. Then, the laser diode driver 87 generates a current for driving the laser diode 88 only when the light emission signal is received. Thus, a duty ratio of light emission of the laser diode 88 can be controlled according to the light emission signal. The size of the laser beam is, for example, 45 µm along main scan direction and 75–84 µm along subscan direction. A size of a dot on the photoconductor in raster scan is, for example, 63.5 µm along main scan direction and 84.7 µm along subscan direction for duty ratio of 100%. The dot size decreases with decreasing duty ratio.

Figure 11:
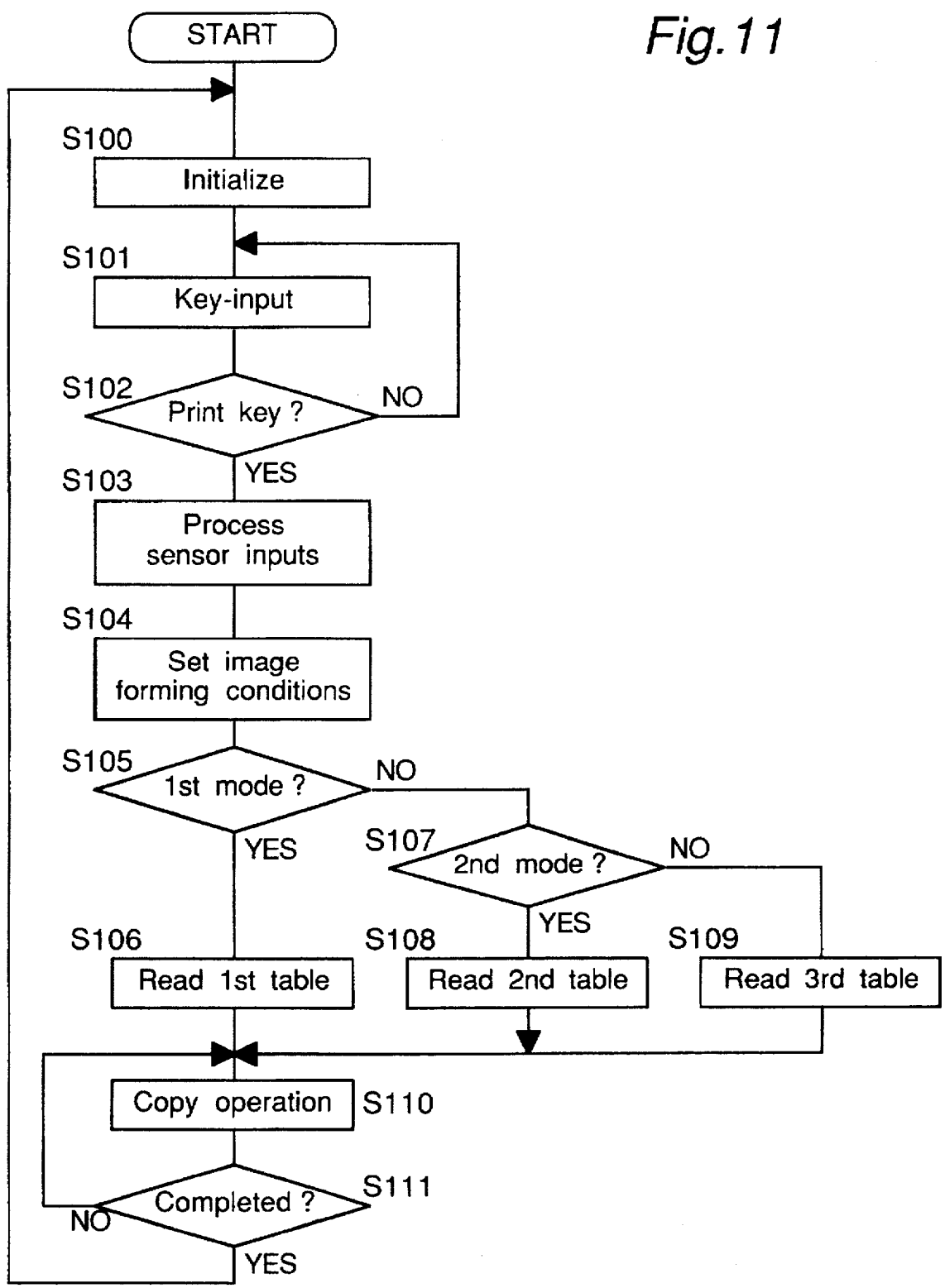
FIG. 11 is a flowchart of a printer controller.

FIG. 11 shows a flow of the copy operation. First, the print controller 201 is initialized (step S100). Next, key-inputs from the operational panel 300 are processed (step S101) until the print key 303 is pressed (YES at step S102). When the print key 303 is pressed (YES at step S102), various sensors including the temperature sensor 95, the humidity sensor 96, the surface potential sensor 97 and other sensors are received (step S103), and image forming conditions in the printer 200 are determined such as a sensitizing potential by the sensitizing charger 43 and a gamma correction table read from the gamma data ROM 94. Then, if the first mode is decided to be selected (YES at step S105), a duty ratio table for the first mode and a standard laser output power $P_2$ are read from the duty data ROM 98 (step S106). If the second mode is decided to be selected (YES at step S107), a duty ratio table for the second mode and a standard laser output power $P_4$ are read from the duty data ROM 98 (step S108). If the third mode is decided to be selected (NOs at steps S105 and S107), a duty ratio table for the third mode and a standard laser output power $P_5$ are read from the duty data ROM 98 (step S109). Next, copy operation is carried out by using the image-forming conditions, the gradation correction table and the duty ratio table (step S110). When the copy operation is completed (YES at step S111), the flow returns to step S100.

As explained above, the gradation curve is changed with the setting of duty ratio. Therefore, a user can select an image quality of a reproduced image by selecting one of the three modes with the key 304.

In the above-mentioned embodiment, the duty ratio is changed in the unit of one dot or one pixel. However, the duty ratio may be changed in the unit of say two or three dots, as disclosed in U.S. patent application Ser. No. 07/971,055, and it is incorporated herewith by referring it. That is, if the duty ratio is set at 80% in the unit of two dots, the laser beam is emitted during a period of 1.6 dot.

In the above-mentioned example, the three modes are provided in the digital copying machine. However, only any one of the three mode may be provided in a digital copying machine.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data is lower than a first predetermined level;

wherein said ratio changing means decreases the ratio as the image density increases if the image density of the image data is lower than the first predetermined level.

2. The digital image forming apparatus according to claim 1, wherein said ratio changing means decreases the ratio linearly as the image density increases.

3. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data is lower than a first predetermined level;

wherein said exposure control means increases the intensity of the beam as the ratio decreases.

4. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data is lower than a first predetermined level;

wherein a period consisting of the light-emitting period and the non-light-emitting period following the light-emitting period corresponds to a predetermined number of dots of image data.

5. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data is higher than a first predetermined level;

wherein said exposure control means increases the intensity of the beam as the ratio decreases.

6. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data is higher than a first predetermined level;

wherein a period consisting of the light-emitting period and the non-light-emitting period following the light-emitting period corresponds to a predetermined number of dots of image data.

7. A digital image forming apparatus comprising:

a photoconductor;

an exposure means for exposing a surface of said photoconductor with a beam in raster scan so as to form an electrostatic latent image thereon based on image data representing image density;

a light-emission control means for inhibiting said exposure means to expose said photoconductor every predetermined period so that a light-emitting period and a non-light-emitting period are provided alternately; and a ratio changing means for changing a ratio of the light-emitting period against a sum of the light-emitting period and the non-light-emitting period according to the image density if the image density of the image data exists in a first range and for maintaining the ratio at a constant value if the image density of the image data exists in a second range.

8. The digital image forming apparatus according to claim 7, wherein said ratio changing means increases the ratio as the image density increases if the image density of the image data exists in the first range.

9. The digital image forming apparatus according to claim 7, wherein said ratio changing means decreases the ratio as the image density increases if the image density of the image data exists in the first range.

10. The digital image forming apparatus according to claim 9, wherein said ratio changing means increases the ratio as the image density increases in a third range, said second range existing between the first range and the third range.

11. The digital image forming apparatus according to claim 7, wherein said exposure means controls an intensity of the beam according to the image data.

* * * * *